Dec. 23, 1941.     C. W. P. HEYLANDT     2,267,461
TWO-STAGE TWO-STROKE INTERNAL COMBUSTION ENGINE
Filed July 8, 1939     2 Sheets-Sheet 1
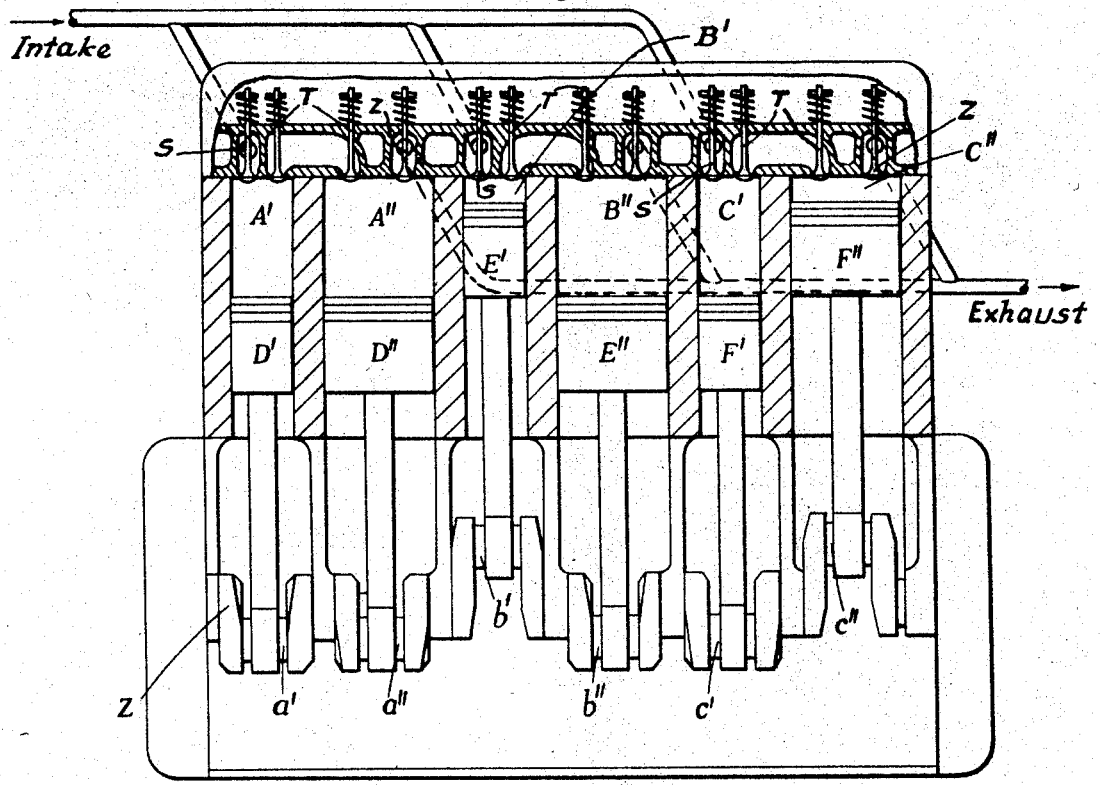
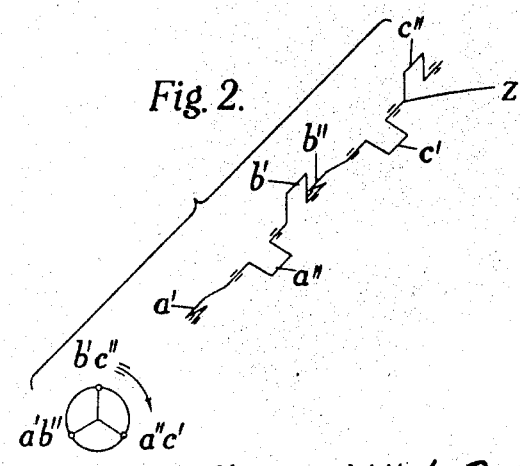
Inventor
Christian Wilhelm Paul Heylandt
Rudolf Mewes
by J. P. McIntosh
Attorney Dec. 23, 1941.   C. W. P. HEYLANDT   2,267,461
TWO-STAGE TWO-STROKE INTERNAL COMBUSTION ENGINE
Filed July 8, 1939   2 Sheets-Sheet 2
Fig. 3.
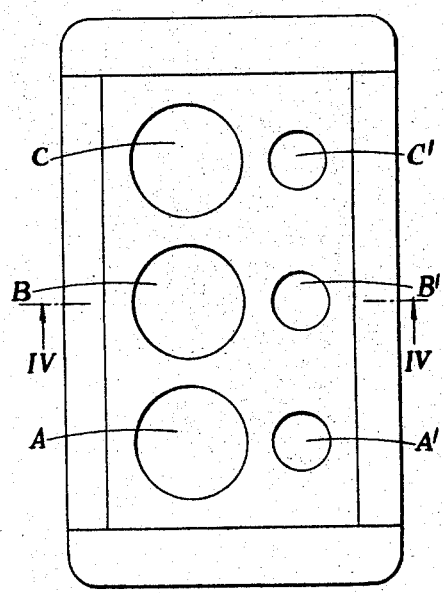
Fig. 4.
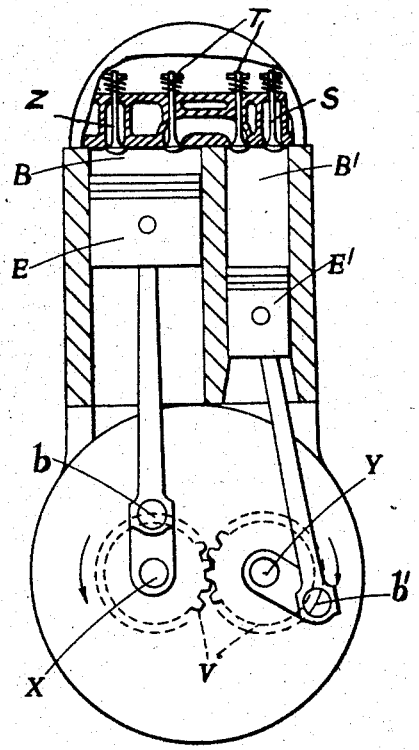
Fig. 6.
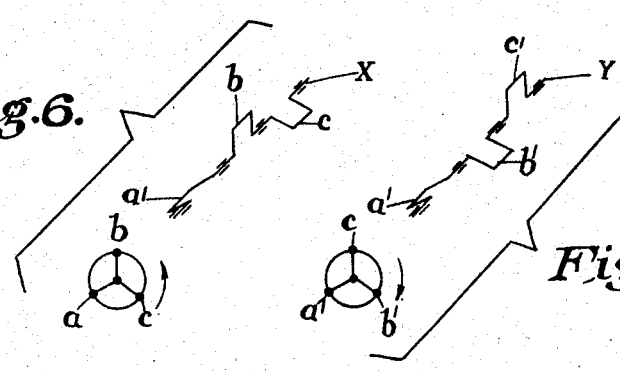
Fig. 5.
Inventor
Christian Wilhelm Paul Heylandt
Rudolf Mewes
by
F. P. McIntosh
Attorney Patented Dec. 23, 1941

2,267,461

UNITED STATES PATENT OFFICE 2,267,461

TWO-STAGE TWO-STROKE INTERNAL COMBUSTION ENGINE

Christian Wilhelm Paul Heylandt and Rudolf Mewes, Berlin-Britz, Germany; said Mewes assignor to said Heylandt Application July 8, 1939, Serial No. 283,330 In Germany July 12, 1938

3 Claims. (Cl. 60—15)

The present invention relates to two-stage, two-stroke internal combustion engines, similar to those disclosed in my co-pending application, Serial No 214,920, filed June 21, 1938, designated as "Process for operating multi-stage combustion gas engines," but wherein the air compressor is omitted as well as the fuel injector, which two instrumentalities are, for the purposes of the present invention, replaceable by any suitable means designed to deliver a combination air and fuel charge to the first-stage cylinders of the engine.

In engines of this kind, it is desirable that the crank of the piston in a combustion and first-stage expansion cylinder should lead by 120° the crank of the piston in the second-stage expansion cylinder into which the combustion products are transferred to do further work before being exhausted. Further, when the diameter of the piston in the second-stage cylinder is substantially twice that of the piston in the first-stage cylinder, the second-stage piston has considerably greater weight. The problem of balancing an engine of this kind is therefore difficult.

An object of the invention is to provide a two-stage, two-stroke internal combustion engine in which the reciprocating and rotating masses are automatically self-balancing, enabling regularity and high speed of running without undue vibration or strain on the parts.

The invention provides a two-stage, two-stroke internal combustion engine comprising, in combination, at least a group of three combustion and first-stage expansion cylinders, a second-stage expansion cylinder associated with each of said first-stage cylinders, a piston in each of the cylinders, and crankshaft means and connecting rod means interconnecting said pistons, the cranks of the pistons in the first-stage cylinders being mutually displaced angularly by 120°, the cranks of the pistons in the second-stage cylinders being mutually displaced angularly by 120°, and the crank of the piston in each first-stage cylinder leading the crank of the piston in the associated second-stage cylinder by 120°.

The three first-stage and three second-stage cylinders comprising each group may be alternately arranged in line with their pistons connected to a single six-throw crankshaft in which each crank is angularly displaced by 120° relative to the next crank.

Alternatively, the three first-stage cylinders of each group may be disposed in line with the three associated second-stage cylinders disposed in a parallel line, the pistons being connected to two three-throw crankshafts in each of which the cranks are mutually displaced by 120°, and the two crankshafts being interconnected by gearing means so that the crank connected with the piston in each first-stage cylinder leads by 120° in the cycle the crank connected to the piston in the associated second-stage cylinder.

In the attached drawings, which show diagrammatically, by way of example, the two foregoing arrangements, Fig. 1 is a longitudinal section of one arrangement, Fig. 2 is a crank diagram of the same, Fig. 3 is a plan of the other arrangement, Fig. 4 is a transverse section on the line IV—IV of Fig. 3, and Fig. 5 is a crank diagram pertaining to the combustion and first-stage expansion cylinders of this other arrangement.

Fig. 6 is a crank diagram pertaining to the second-stage cylinders of this other arrangement.

As shown in Fig. 1, three combustion and first-stage expansion cylinders A', B' and C' are disposed alternately with three second-stage expansion cylinders A'', B'' and C'' in line. Each of the combustion and first-stage expansion cylinders is connected with one of the second-stage expansion cylinders, i. e., A' with A'', B' with B'' and C' with C'', for the transfer of its products of combustion in the manner shown. Reference S denotes the inlet valves to the combustion and first-stage expansion cylinders, T the transfer valves, and Z the exhaust valves from the second-stage expansion cylinders. The six pistons in the cylinders are connected each to a crank of a single six-throw crankshaft Z. It is to be seen, more clearly from the crank diagram, Fig. 2, that the cranks of $a'$, $b'$ and $c'$ of the pistons D', E' and F' in the first-stage cylinders are mutually displaced by 120°, and the cranks $a''$, $b''$ and $c''$ of the pistons D'', E'' and F'' in the second-stage cylinders are also mutually displaced by 120°. Further, the crank $a'$ connected with the piston D' in the first-stage cylinder A' leads the crank $a''$ connected with the piston D'' in the second-stage cylinder A'' by 120°, and the cranks $b'$, $b''$ and $c'$, $c''$ are similarly related. Thus, not only are the two sets of pistons, namely, the smaller pistons D', E' and F' and the larger pistons D'', E'' and F'' each self-balanced, but the desired working cycle in each couple of first- and second-stage cylinders A', A'', B', B'' and C', C'' is attained.

It is assumed that the intake manifold, designated as "intake" in the drawings, conveys to the first-stage cylinders a pre-compressed mixture of combustibles and air, delivered from any conventional type of pump-compressor, not shown. It is further assumed that all valves are operated by a suitably designed camshaft, and that all first-stage cylinders are provided with ignition means, such as spark plugs. Inasmuch as such instrumentalities are conventional, and may be readily timed for desired operations, they are also omitted from the drawings as superfluous.

The operation of the engine closely follows that of a typical two-stroke cycle internal combustion motor. During the last quarter of the upward piston stroke of the first-stage cylinder, intake valve S opens and admits a pre-compressed combustible charge into the cylinder. At that moment transfer valves T, controlling the transfer passage connecting the first-stage cylinder with its corresponding second-stage cylinder, are still open. Thus the fresh charge introduced through open intake valve S scavenges the products of combustion still present in the first-stage cylinder and forces them into the second-stage cylinder.

Immediately following this transfer of gases valves T close, and the final period of expansion of combusted products in the second-stage cylinder takes place. Simultaneously the new charge in the first-stage cylinder is being subjected to compression as the piston of that stage nears its upper dead center; and just before the piston reaches that position the compressed charge becomes ignited by a spark plug or other ignition means, not shown.

Meantime the piston of the second expansion stage has passed its outer dead center and moves inwards, thereby expelling, by way of the now open exhaust valve Z, the twice expanded products of combustion through the exhaust manifold, marked "exhaust" in the drawings, into the atmosphere.

As has been said before, the ignition and combustion of the compressed charge in the first-stage cylinder takes place at the moment when its piston approaches its upper dead center. When the piston has passed that position, the primary expansion of the combustion products drives the piston towards its outer dead center position. Just after the piston has passed the latter position, and shortly before the piston of the second expansion stage reaches its upper dead center, transfer valves T open. At this moment commences the transfer of combustion products from the first to the second stage cylinder.

These transfer valves remain open during the major portion of the inward or upward movement of the piston of the first-stage cylinder; they close at a moment shortly before the piston reaches its last quarter of its upward stroke, but not before intake valve S commences to open. Thus a full operating cycle of the engine is completed.

The same result may be achieved by the arrangement as shown in Figs. 3 to 5, wherein three first-stage cylinders A', B' and C' are disposed in line, and three second-stage cylinders A, B and C are disposed in a parallel line. Here the cylinder A' is connected with the cylinder A, the cylinder B' with the cylinder B and the cylinder C' with the cylinder C for the transfer of the combustion products in a manner apparent from Fig. 4 where reference S denotes the inlet valve to the cylinder B', T the transfer valves, and Z the exhaust valve from its associated cylinder B. The pistons in the cylinders A', B' and C' are respectively connected with cranks a', b' and c' of a three-throw crankshaft Y (Fig. 5) and the pistons in the cylinders A, B and C are respectively connected with cranks a, b and c of a three-throw crankshaft X. Evidently, the set of smaller pistons is self-balanced by the 120° mutual displacement of the cranks a', b' and c', and the set of larger pistons is likewise balanced. Further, the crankshafts Y and X are interconnected by gear wheels V in such relationship that crank a' leads crank a, crank b' leads crank b, and crank c' leads crank c each by 120° in the cycle, allowing for the fact that the crankshafts turn in opposite directions. For example, as shown in Fig. 4, the crank b' is 120° forward from top dead centre, under a firing impulse on piston E', and crank b has just brought piston E to top dead centre at the end of an exhaust stroke in readiness to be worked upon by expanding hot gases, transfer of which from cylinder B' to cylinder B is about to commence. Further crank c' being at the top dead centre, crank c has 120° to turn anti-clockwise to its top dead centre, while cranks a' and a have respectively 120° clockwise and 240° anti-clockwise to turn before reaching top dead centre. From the end views in Fig. 5 it is evident that the rotary masses are also balanced.

In both the arrangements described, each second-stage cylinder is disposed closely adjacent its associated first-stage cylinder, so that the transfer ports may be of clean and short design, and the efficiency of transfer of the gases enhanced.

We claim:

1. A two-stage, two-stroke internal combustion engine comprising, in combination, at least one group of three combustion and first-stage expansion cylinders, at least one group of three second-stage expansion cylinders, one for each of said first-stage cylinders, means connecting each first-stage cylinder with its associated second-stage cylinder for the transfer thereto of the combustion products, a piston in each of the cylinders, and crankshaft means and connecting rod means interconnecting said pistons, the cranks of the pistons in the first-stage cylinders being mutually displaced angularly by 120°, the cranks of the pistons in the second-stage cylinders being mutually displaced angularly by 120°, and the crank of the piston in each first-stage cylinder leading the crank of the piston in the associated second-stage cylinder by 120°.

2. A two-stage, two-stroke internal combustion engine as claimed in claim 1, having the first- and second-stage cylinders alternately arranged in line, and a single crankshaft in which each crank is angularly displaced by 120° relative to the next crank.

3. A two-stage, two-stroke internal combustion engine as claimed in claim 1, having the three first-stage cylinders disposed in line, the three second-stage cylinders disposed in a parallel line, two three-throw crankshafts, the cranks in each of said crankshafts being respectively connected to the pistons in one of said lines of cylinders, and gearing means interconnecting the crankshafts in mutual relationship such that the crank connected to the piston in each first-stage cylinder leads by 120° in the cycle the crank connected to the piston in the associated second-stage cylinder.

CHRISTIAN WILHELM PAUL HEYLANDT.
RUDOLF MEWES.